3,051,742
β-HYDROXY-BUTYRIC ACID AMIDE DERIVATIVES AND PROCESS OF PREPARING THEM
Gustav Ehrhart, Bad Soden (Taunus), Ingeborg Hennig, Kelkheim (Taunus), Ernst Lindner, Frankfurt am Main, and Heinrich Ott, Eppstein (Taunus), Germany, assignors to Farbwerke Hoechst Aktiengesellschaft vormals Meister Lucius & Brüning, Frankfurt am Main, Germany, a corporation of Germany
No Drawing. Filed Nov. 25, 1958, Ser. No. 776,195
Claims priority, application Germany Nov. 30, 1957
3 Claims. (Cl. 260—475)

The present invention relates to β-hydroxy-butyric acid amide derivatives of the general formula

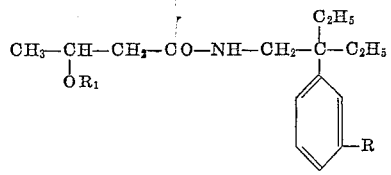

wherein R represents a methoxy or ethoxy group and $R_1$ stands for the radical of a dicarboxylic acid that may be substituted and that is capable of forming inner anhydrides, in this dicarboxylic acid the non-esterified carboxyl group can also be present in the form of a salt of an inorganic or organic base. The aforesaid compounds are valuable medicaments which are distinguished, apart from a low toxicity, particularly by narcotic properties.

The present invention relates also to the manufacture of such β-hydroxy-butyric acid amide derivatives according to methods generally used for the preparation of substituted carboxylic acid amides. The following methods of preparation may particularly be mentioned:

Acetoacetic acid amides of the formula

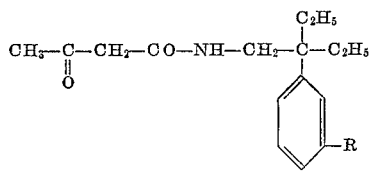

wherein R has the meaning given above, may be reduced and a dicarboxylic acid radical that may be substituted and corresponds to the meaning given for $R_1$ may be introduced into the hydroxy group in β-position of the compounds obtained by means of the usual acylation methods. The acetoacetic acid amides used as starting substances are preferably obtained by reaction of amines of the formula

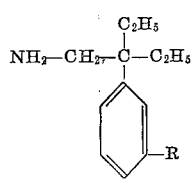

wherein R has the aforesaid meaning, with diketene; the reduction of the acetoacetic acid amides obtained to the desired β-hydroxy-butyric acid amide derivatives can also be carried out without isolation of these acetoacetic acid amides. It is also possible to react butyric acids of the formula

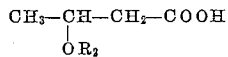

or their reactive derivatives, with amines of the formula

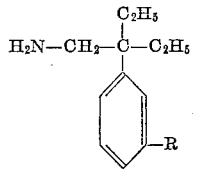

wherein $OR_2$ means a hydroxy group that may be protected and R has the meaning given above, and to replace the radical $R_2$ in the hydroxy group in β-position by a dicarboxylic acid radical, that may be substituted and corresponds to the meaning given for $R_1$, by means of the usual acylation methods, and, in case the radical $R_2$ stands for an acyl radical of a mono-basic carboxylic acid, previously it is possible to eliminate this radical by acid or alkaline hydrolysis.

Furthermore, the desired β-hydroxy-butyric acid amide derivatives may be prepared by treating β-amino-butyric acid amides of the formula

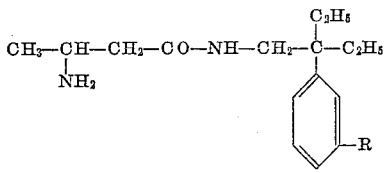

with the calculated quantity of nitrous acid and introducing by means of the usual acylation methods a dicarboxylic acid radical, that may be substituted and that corresponds to the meaning given for $R_1$, into the hydroxy group in β-position of the compounds obtained. It is also possible to react β-butyrolactone with amines of the formula

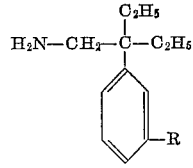

and to introduce into the hydroxy group in β-position of the compounds obtained by means of the usual acylation methods a dicarboxylic acid radical that may be substituted and that corresponds to the meaning given for $R_1$. Finally, the desired β-hydroxy-butyric acid amide derivatives may be obtained by methylating or ethylating the phenolic hydroxy group, if desired without isolation, of β-hydroxy-butyric acid amide derivatives of the formula

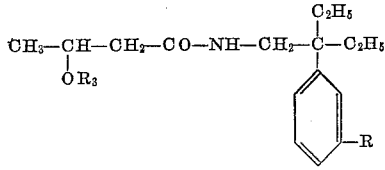

wherein R and $OR_2$ stand for a hydroxy group that may be protected, and by replacing the radical $R_2$ in the hydroxy group in β-position by means of the usual acylation methods by a dicarboxylic acid radical that may be substituted and that corresponds to the meaning given for $R_1$.

The products of the present invention may be prepared with particular advantage by means of the reduction of corresponding acetoacetic acid amides. As starting substances there may be used acetoacetic-[2-(meta-methoxyphenyl)-2-ethyl-butyl-(1)]-amide and acetoacetic acid-[2-(meta-ethoxy-phenyl)-2-ethyl-butyl-(1)]-amide.

The aforesaid acetoacetic acid amides may, for example, be prepared by addition of diketene to the corresponding amines in the presence of organic solvents.

The acetoacetic acid alkyl amides may be reduced in known manner to the β-hydroxy-butyric acid alkyl amides. The reduction of the keto group may, for example, be carried out catalytically in the presence of metals of the 8th group of the periodic system, preferably nickel catalysts, in the presence of customary solvents, such as aqueous alcohols, alcohols or water. Noble metals or Raney catalysts may also be used. It is also possible to carry out the reduction by means of nascent hydrogen, for example, with aluminum amalgam and alcohol, sodium amalgam, or sodium boron hydride. The reduction may also be carried out electrolytically.

The reaction of β-hydroxy-butyric acid, whose hydroxy group may also be protected by acyl radicals, or their functional derivatives with amines of the indicated formula, is carried out in known manner. As β-acyloxy-butyric acids there may be mentioned: β-acetoxy-butyric acid, β-propionoxy- and β-butyroxy-butyric acid. According to the process of the present invention there are used as reactive derivatives with special advantage the low molecular alkyl esters or the phenol esters of these acids. The reaction is effected in the usual manner by heating both components for a prolonged time, if necessary in an autoclave. As amines may be mentioned: meta-methoxy- or meta-ethoxy-phenyl-2-ethyl-butyl-(1)-amine.

A likewise advantageous process starting from functional derivatives of the β-hydroxy-carboxylic acids consists in reacting β-hydroxy-butyric acid halides, preferably corresponding acid chlorides or bromides of the β-hydroxy-butyric acid, whose hydroxy group is suitably substituted by an acyl radical, with the amines mentioned. The reaction is suitably carried out in inert solvents, for example, ether, benzene, toluene, methylene chloride or chloroform, in the presence of an agent splitting off hydrohalic acid and, generally, is already successful in the cold. It is of particular advantage to use as the agent splitting off hydrohalic acid a second molecular proportion of the amine used for the reaction. The hydrohalic acid of the amine that has separated can directly be filtered off with suction or be removed by shaking with water. The acyl radical in the carboxylic acid halide previously introduced for the protection of the β-hydroxy group can then be removed in the usual manner, for example by hydrolyzation with dilute alkalies or acids.

In addition, the β-hydroxy-butyric acid amides can be obtained from the β-amino-butyric acid amides prepared according to the usual methods. To these β-amino-butyric acid amides containing the desired substituents at the amide nitrogen atom, there are added dropwise, for example in the presence of a dilute mineral acid, preferably hydrochloric or sulfuric acid, while stirring and, if desired, while cooling, an equimolar quantity of a concentrated aqueous solution of an alkali metal nitrite, preferably sodium nitrite. The evolution of nitrogen, indicating the transformation of the amino group into the hydroxy group, generally commences when warming the reaction mixture to room temperature. The reaction mixture is stirred for some time at room temperature, if necessary at moderately elevated temperatures (for example on the steam bath) until the evolution of gas has ceased and thus the transformation of the amino group into the hydroxy group is complete.

As starting material for preparing the compounds of the invention there is likewise suitable β-butyrolactone which can be prepared according to known processes, for example, by catalytic hydrogenation of diketene. By reaction with the aforementioned amines the said β-hydroxy-butyric acid amides are directly obtained. This reaction takes place by the action of the two components in the presence or absence of solvents, for example, water or organic solvents, such as alcohols, benzene, toluene or ethers. Usually, the reaction starts spontaneously and the reaction products can be isolated from the reaction mixture by fractional distillation or by crystallization.

For preparation of the desired compounds of the above-mentioned formula, wherein $R_1$ means the radical of a dicarboxylic acid that may be substituted, the butyric acid amides with a free β-hydroxy group obtainable in a manner described above may be esterified unilaterally with dicarboxylic acids that may be substituted and that are capable of forming inner anhydrides. As such dicarboxylic acids both carboxylic acid groups of which are preferably linked by 1–4 carbon atoms there may be mentioned: succinic acid, methyl-succinic acid, dimethyl-succinic acid, glutaric acid, methyl-glutaric acid, dimethyl-glutaric acid, adipic acid, acyloxy-succinic acids, acyloxy-tartaric acids and acyl derivatives of amino-dicarboxylic acids. There are also suitable unsaturated dicarboxylic acids, such as maleic acid. Apart from aliphatic open-chain dicarboxylic acids there may also be used cyclic, aliphatic, aromatic or partially hydrogenated aromatic dicarboxylic acids that may be substituted. As such there are mentioned: hexahydro-phthalic acid, tetrahydro-phthalic acid, phthalic acid and, for example, chloro-phthalic acids. For esterification there are advantageously used molar quantities of the anhydrides of the said dicarboxylic acids which are caused to act upon the β-hydroxy-butyric acid amides in the presence of an organic solvent, for example pyridine, in which case heating can be of advantage. For the practical use of the products of the present invention it is of advantage to neutralize the other free carboxylic acid in the usual manner. The salts thus obtained, particularly the alkali metal salts, show a considerably increased solubility in water.

It is also possible to carry out the unilateral esterification with a dicarboxylic acid by reesterification of β-acyloxy-butyric acid-[2-(meta-alkoxy-phenyl)-2-ethyl-butyl-(1)]-amides. The reaction is carried out under the usual reesterification conditions.

The products of the present invention are valuable medicaments and apart from a very low toxicity have favourable therapeutic properties. According to the quantity of the administered dose they may be used as very good sedatives, hypnotics and narcotics.

In order to test the products of the present invention for their narcotic action, mice were given an intravenous injection of 75 mg./kg. of the sodium salt of β-succinoxy-butyric acid-[2-(meta-methoxy-phenyl)-2-ethyl-butyl-(1)]-amide in the form of an aqueous solution of 1% strength. The treated mice were narcotized and they remained quietly on their backs. When administering the afore-mentioned dose the narcosis lasted for about 15 minutes. When 150 mg./kg. were injected, the narcosis lasted for about 30 minutes. When using rats as test animals an intravenous injection of 75 mg./kg. of the said compound produced likewise a narcosis lasting for 15 minutes during which the animals could be turned on their backs and remained there. 150 mg./kg. produced a prolonged effect also in the case of rats; the narcosis lasted for about 30 minutes. The same applies to the dog in which case the intravenous injection of an aqueous 10% solution of 40 mg./kg. led to a deep and quiet narcosis starting 5 minutes after the injection. The postural reflexes had ceased while the corneal reflex could still be elicited; the animals remained on their backs. The greatest depth of the narcosis lasted for about 30 minutes. One hour after the injection the dogs ran about again. Of special importance is that the dogs fall asleep and wake up without any excitation.

A special advantage for the application of the products of the present invention as medicaments is their relatively low toxicity. When the said compound was given intravenously to mice or rats the toxicity amounted to 250 mg./kg. A great advantage of the products of the invention for their practical use resides in the fact that they are markedly water-soluble. Whereas the β-hydroxy-butyric acid-[2-(meta-methoxy-phenyl)-2-ethyl-butyl-(1)]-amide is practically insoluble in water and, therefore, for injection purposes has to be dissolved in propylene glycol, the products of the invention can be applied in the form of aqueous solution; thus the circulation is not affected unfavourably by the solvent.

As compared with the β-hydroxy-butyric acid-[2-(metamethoxy-phenyl)-2-ethyl-butyl-(1)]-amide and, for example, also with the barbiturates, the products of the present invention show the advantage that their narcotic action does not set in suddenly but gradually.

The following examples serve to illustrate the invention but they are not intended to limit it thereto.

EXAMPLE 1

(a) β-Hydroxy-Butyric Acid-[2-(Meta-Methoxy-Phenyl)-2-Ethyl-Butyl-(1)]Amide 17.5 grams of diketene are added dropwise, at 35 to 40° C., to 40 grams of 2-(meta-methoxy-phenyl)-2-ethyl-butyl-(1)-amine in 80 cc. of benzene. After stirring for 30 minutes at 70° C. the solvent is eliminated under reduced pressure, the remaining oily acetoacetic acid-[2-(meta-methoxy-phenyl)-2-ethyl-butyl-(1)]-amide (58 grams) is dissolved in 130 cc. of methanol and after addition of 60 cc. of water 2.3 grams of sodium boron hydride are added in portions. After the reaction has ceased the methanol is distilled off under reduced pressure and the residue is taken up in ether. After washing with water, drying and distilling off the solvent there are obtained 54 grams of β-hydroxy-butyric acid-[2-(metamethoxy-phenyl)-2-ethyl-butyl-(1)]amide in the form of a viscous yellow oil.

Analysis.—Found for: C, 69.8; H, 9.5; N, 4.7. Calculated for: C, 69.6; H, 9.22; N, 4.78.

($b_1$) β-Succinoxy-Butyric Acid-[2-(Meta-Methoxy-Phenyl)-2-Ethyl-Butyl-(1)]-Amide 160 grams of β-hydroxy-butyric acid-[2-(meta-methoxy-phenyl)-2-ethyl-butyl-(1)]-amide are heated for 90 minutes on the steam bath with 80 grams of succinic anhydride in 80 cc. of pyridine. After the pyridine has been distilled off, water and ether are added to the residue. The ether layer is washed with dilute hydrochloric acid and water and then extracted by means of a dilute sodium carbonate solution. After filtration in the presence of animal charcoal the aqueous alkaline solution is acidified and extracted with ether. After drying and distilling off the ether, water is added to the residue (200 grams of a colourless oil that can be crystallized by means of acetic acid ester/petrol ether; melting point 86–87° C.) and, while stirring, also 27.8 grams of anhydrous sodium carbonate in portions. After concentration of the neutral solution under reduced pressure the sodium salt of the β-succinoxy-butyric acid-[2-(metamethoxy-phenyl)-2-ethyl-butyl-(1)]amide is obtained in the form of a white, strongly hygroscopic, amorphous powder.

($b_2$) β-Succinoxy-Butyric Acid-[2-(Meta-Methoxy-Phenyl)-2-Ethyl-Butyl-(1)]-Amide 50 grams of the amide obtained according to Example 1a are heated for 4 hours on the steam bath with 25 grams of succinic anhydride. The reaction product is taken up in benzene and washed with water. The benzene layer is extracted with a dilute sodium carbonate solution, the aqueous alkaline layer is acidified with dilute hydrochloric acid and extracted by means of ether. There are obtained 59 grams of the oily β-succinoxy-butyric acid-[2-(meta-methoxy-phenyl)-2-ethyl-butyl-(1)]-amide. After addition of acetic acid ester and a little petroleum ether there are obtained 51 grams of the crystalline acid melting at 86–87° C. After titration with the calculated quantity of dilute sodium hydroxide solution the mixture is concentrated under reduced pressure and after lyophilization the sodium salt of the above acid is obtained in the form of a white hygroscopic powder.

($b_3$) β-[(Methyl-Succin)-Oxy]-Butyric Acid-[2-(Meta-Methoxy-Phenyl)-2-Ethyl-Butyl-(1)]-Amide 58.6 grams of the amide obtained according to Example 1a are heated for 90 minutes on the steam bath with 22.8 grams of methyl-succinic anhydride and 40 cc. of pyridine. The reaction product is worked up as described in Example 1$b_1$. The β-methyl-succinoxy-butyric acid-[2-(meta-methoxy-phenyl)-2-ethyl-butyl-(1)]-amide is obtained in the form of a colourless oil (38 grams) that takes up the calculated quantity of sodium hydroxide solution when titrated.

($b_4$) β-Maleoxy-Butyric Acid-[2-(Meta-Methoxy-Phenyl)-2-Ethyl-Butyl-(1)]-Amide 25 grams of the amide obtained according to Example 1a are heated for 3 hours on the steam bath with 25 grams of maleic anhydride. The product is worked up as described in Example 1$b_2$. There are obtained 30.5 grams of β-maleoxy-butyric acid-[2-(meta-methoxy-phenyl)-2-ethyl-butyl-(1)]-amide in the form of a colourless oil that uses the theoretical quantity of sodium hydroxide solution when titrated.

($b_5$) β-[(2-Carboxy-Benzoyl)-Hydroxy]-Butyric Acid-[2-(Meta-Methoxy-Phenyl)-2-Ethyl-Butyl-(1)]-Amide 40 grams of the amide obtained according to Example 1a are heated for 3 hours on the steam bath with 20.2 grams of phthalic anhydride and 40 cc. of pyridine. The reaction product is worked up as described in Example 1$b_1$. There are obtained 52 grams of β-(2-carboxy-benzoyl)-hydroxy-butyric acid-[2-(meta-methoxy-phenyl)-2-ethyl-butyl-(1)]-amide which are transformed into the sodium salt by adding the calculated quantity of sodium hydroxide solution.

($b_6$) β-[(2-Carboxy-3-Chloro-Benzoyl)-Hydroxy]-Butyric Acid - [2-(Meta-Methoxy-Phenyl)-2-Ethyl-Butyl-(1)]-Amide 15 grams of the amide obtained according to Example 1a are transformed in the manner described in Example 1$b_5$ with 9 grams of 3-chloro-phthalic anhydride and 25 cc. of pyridine into the β-[(2-carboxy-3-chloro-benzoyl)-hydroxy]-butyric acid-[2-(meta-methoxy-phenyl)-2-ethyl-butyl-(1)]-amide.

($b_7$) β - [(2-Carboxy-Hexahydrobenzoyl)-Hydroxy]-Butyric Acid-[2-(Meta-Methoxy-Phenyl)-2-Ethyl-Butyl-(1)]-Amide 58.6 grams of the amide obtained according to Example 1a are transformed in the manner described in Example 1$b_1$ with 30.8 grams of hexahydrophthalic anhydride and 40 cc. of pyridine into the β-[(2-carboxy-hexahydrobenzoyl)-hydroxy]-butyric acid-[2-(meta-methoxy-phenyl)-2-ethyl-butyl-(1)]-amide.

($b_8$) β-Glutaroxy-Butyric Acid-[2-(Meta-Methoxy-Phenyl)-2-Ethyl-Butyl-(1)]-Amide 58.6 grams of the amide obtained according to Example 1a are transformed in the manner described in Example 1$b_1$ with 22.8 grams of glutaric acid anhydride and 30 cc. of pyridine into the β-glutaroxy-butyric acid-[2-(meta-methoxy-phenyl)-2-ethyl-butyl-(1)]-amide.

EXAMPLE 2

15 grams of β-hydroxy-butyric acid ethyl ester and 25 grams of 2 - (meta-methoxy-phenyl)-2-ethyl-butyl-(1)-amine are boiled under reflux for 10 hours in the oil bath at a temperature of 160° C. The surplus quantities of ester and amine are distilled off at the oil pump at a bath temperature of 160° C. There is obtained β-hydroxy-butyric acid-[2-(meta-methoxy-phenyl)-2-ethyl-butyl-(1)]-amide as residue in the form of an almost colourless oil.

The dicarboxylic acid radical is introduced into the hydroxy group in β-position according to one of the processes described in Examples $1b_1$ to $1b_8$.

EXAMPLE 3

15 grams of β-amino-butyric acid-2-[2-(meta-methoxy-phenyl)-2-ethyl-butyl(1)]-amide are dissolved in 100 cc. of dilute hydrochloric acid and warmed on the steam bath. To the solution there is added, while stirring and heating, a concentrated aqueous solution of 4 grams of sodium nitrite. When the evolution of nitrogen has ceased the solution is extracted with ether. The ether residue is distilled under reduced pressure: Boiling point 180–190° C. under a pressure of 0.1 mm./Hg whereby the desired β-hydroxy-butyric acid-[2-(meta-methoxy-phenyl)-2-ethyl-butyl-(1)]-amide is obtained.

The reaction with a dicarboxylic anhydride is effected as described in Examples $1b_1$ to $1b_8$.

EXAMPLE 4

To the solution of 9 grams of β-butyrolactone in 30 cc. of ether there is added, while cooling, the solution of 29.3 grams of 2-(meta-methoxy-phenyl)-2-ethyl-butyl-(1)-amine in 60 cc. of ether. After standing for 12 hours the surplus reagents are distilled off and the residue is distilled under reduced pressure: Boiling point 185–190° C. under a pressure of about 0.1 mm./Hg whereby the desired β-hydroxy-butyric acid-[2-(meta-methoxy-phenyl)-2-ethyl-butyl-(1)]-amide is obtained.

The reaction with a dicarboxylic anhydride is effected as described in Examples $1b_1$ to $1b_8$.

EXAMPLE 5

(a) *β-Hydroxy-Butyric Acid-[2-(Meta-Hydroxy-Phenyl)-2-Ethyl-Butyl-(1)]-Amide*

24.1 grams of 2-(meta-hydroxy-phenyl)-2-ethyl-butyl-(1)-amine are suspended in 100 cc. of benzene. To the suspension there is added dropwise at 30–40° C. a solution of 10.5 grams of diketene in 30 cc. of benzene. When the dropwise addition is finished the reaction mixture is heated for a short time to 60° C. and the benzene is then distilled off under reduced presure. The remaining 35.5 grams of acetoacetic acid-[2-(meta-hydroxy-phenyl)-2-ethyl-butyl-(1)]-amide are dissolved in 150 cc. of methanol and to the solution are added 10 cc. of water and 4.5 grams of sodium boron hydride in portions. After acidification with dilute hydrochloric acid water is added. 29.5 grams of β-hydroxy-butyric acid-[2-(meta-hydroxy - phenyl)-2-ethyl-butyl-(1)]-amide crystallize. The melting point amounts to 153° C. after recrystallization from water/alcohol.

(b) *β-Succinoxy-Butyric Acid-[2(Meta-Ethoxy-Phenyl)-2-Ethyl-Butyl-(1)]-Amide*

14 grams of β-hydroxy-butyric acid-[2-(meta-hydroxy-phenyl)-2-ethyl-butyl-(1)]-amide are shaken for 5 hours with 26 cc. of a 2 N-sodium hydroxide solution, 50 cc. of water and 8 grams of diethyl sulfate, whereupon an oil deposits. After extraction with ether and washing of the ether layer there are obtained 10.8 grams of a viscous oil (analysis—N calculated: 4.56; found: 4.55).

From the β - hydroxy-butyric acid-[2-(meta-ethoxy-phenyl)-2-ethyl-butyl-(1)]-amide formed there is obtained with succinic anhydride and pyridine in the manner described in Example $1b_1$ the sodium salt of β-succinoxy-butyric acid-[2-(meta-ethoxy-phenyl)-2-ethyl-butyl-(1)]-amide in the form of a white, amorphous powder.

EXAMPLE 6

21 grams of β-hydroxy-butyric acid-[2-(meta-hydroxy-phenyl)-2-ethyl-butyl-(1)]-amide obtained according to Example 5a are shaken for 5 hours with 40 cc. of 2 N-sodium hydroxide solution, 80 cc. of water and 12 grams of dimethyl sulfate, whereupon an oil deposits. After extraction with ether and washing of the ether layer there are obtained 15 grams of oily β-hydroxy-butyric acid-[2-(meta-methoxy-phenyl)-2-ethyl-butyl-(1)] - amide in the form of an oil.

The reaction with a dicarboxylic anhydride can be effected as described in Examples $1b_1$ to $1b_8$.

We claim:

1. β-Hydroxy butyric acid amide derivatives of the formula

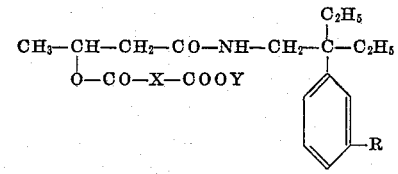

wherein R represents a member selected from the group consisting of methoxy and ethoxy and wherein X is a member of the group consisting of alkenylene having up to five carbon atoms and six-membered monocyclic carbon rings and Y is a member selected from the group consisting of hydrogen, alkali metal and ammonium.

2. The compound of the formula

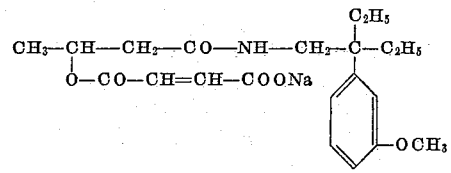

3. The compound of the formula

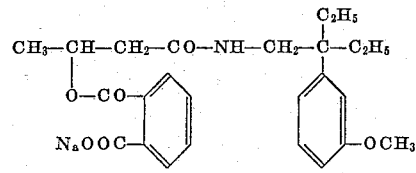

References Cited in the file of this patent

UNITED STATES PATENTS

| | | |
|---|---|---|
| 2,548,155 | Gresham | Apr. 10, 1951 |
| 2,841,610 | Lott | July 1, 1958 |
| 2,853,418 | Smith | Sept. 23, 1958 |
| 2,872,370 | Berger | Feb. 3, 1959 |
| 2,879,288 | Grosskinsky | Mar. 24, 1959 |